Feb. 9, 1937. P. M. BOURDON 2,069,911
VEHICLE SUSPENSION
Filed March 23, 1935 3 Sheets-Sheet 2

Inventor
Pierre Marcel Bourdon
By Wilkinson & Mawhinney
Attorneys.

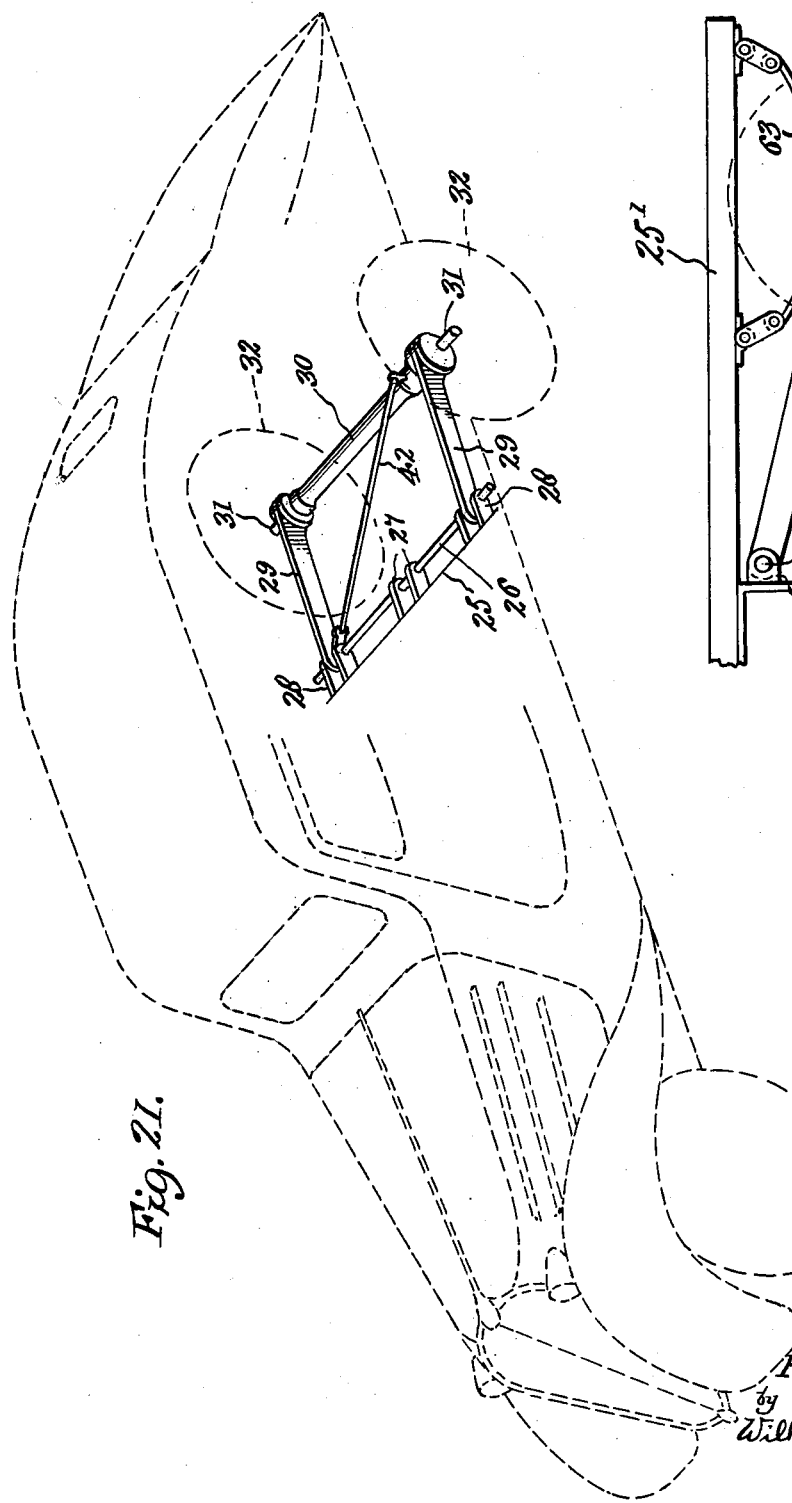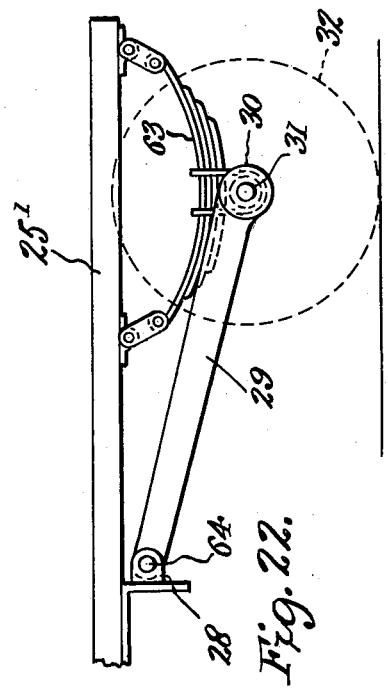

Patented Feb. 9, 1937

2,069,911

UNITED STATES PATENT OFFICE 2,069,911

VEHICLE SUSPENSION

Pierre Marcel Bourdon, Paris, France, assignor to Michelin et Cie, Clermont-Ferrand, France, a corporation of France Application March 23, 1935, Serial No. 12,697
In France July 30, 1934

3 Claims. (Cl. 267—57)

The present invention relates to vehicle body suspension means from axles, and has for an object to provide an axle for vehicles and its mounting, the axle having a construction to maintain a rigid connection between the wheels on opposite ends of the axle but offering less resistance to torque about its axis than that of the rigid axles. Furthermore the axle is preferably connected to the vehicle by tie rods or connecting rods which are capable of a certain amount of bending or torsion so that the rods may be rigidly fixed to the axle without destroying their action in following the displacement of the axle.

Another object of the invention is to eliminate all sliding or frictionally engaging parts, such as leaf springs, and all loose or pivoted connections such as shackles and the like, and to provide rigid connections between parts which of themselves, and by virtue of their construction and mounting, admit yielding or springing action to take up road shock and equalize the suspension or support of the vehicle body.

The invention also provides a construction wherein is eliminated all bearing parts requiring greasing, and provides a construction which carries out the objects of the invention chiefly by torsional displacement although capable of being supplemented by other elastic connections and the like.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a plan view of a vehicle frame with an axle mounted thereon according to the present invention.

Figure 21 is a perspective phantom view of a motor vehicle, showing the invention applied thereto, and Figure 22 is a fragmentary side elevation of a modified mounting of the axle and connecting arms associated with a leaf spring suspension means.

Figure 1:
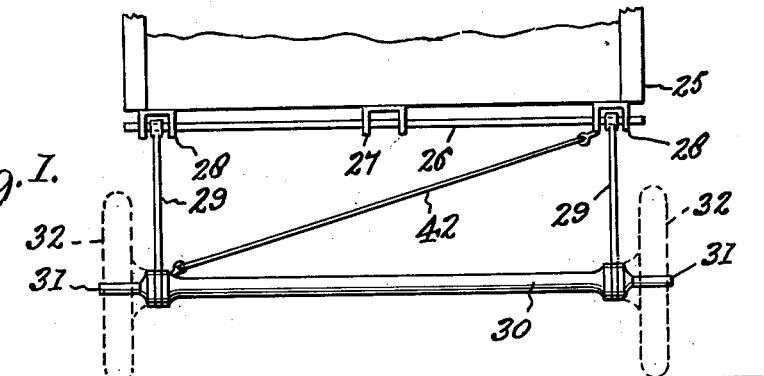

Referring now to Figures 1 and 21, 25 designates the rear end portion of a vehicle, or frame thereof, which may be of any suitable construction. A torsion rod 26 is arranged transversely across the rear end of the body 25 and is securely fixed and anchored at its central portion to the body 25 in any suitable manner, as by a bracket 27, so that the rod 26 cannot turn in the bracket or on the body 25. The opposite or free ends of the torsion rod 26 are rotatably mounted in brackets 28 or the like merely for the purpose of holding the ends of the rod 26 against displacement out of its axial position.

The brackets 28 may be fixed on the rear end of the body 25, and tie rods or arms 29 are fixedly secured to the opposite ends of the torsion rod 26 so as to swing on the axis of the torsion rod as the latter is twisted under pressure or strain imposed upon either end of the arms 29. Preferably the arms 29 are attached to the torsion rod 26 within the brackets 28 although this is not essential.

Figure 5:
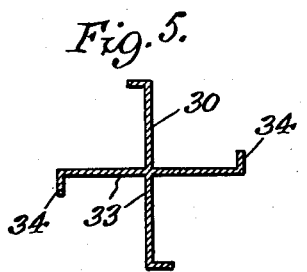
Figure 5 is a detail enlarged transverse section taken through one form of the wheel axle.

The arms or rods 29 extend horizontally rearward from the rear end of the body 25 and may be inclined downwardly at a desired angle, and at their outer ends are fixedly secured to the end portions of an axle 30. The axle 30 is constructed to admit of torsional strain but to maintain its longitudinal axis and is provided at opposite ends with spindles 31 for supporting carrier wheels 32 or the like by means of which the vehicle may be supported. These wheels 32 may be of the usual construction of automobile wheels, may be flanged wheels for use on rails or may be of any other suitable construction depending upon the make and use of the vehicle. The axle 30 is capable of various cross sectional constructions and, as shown in Figure 5, it may comprise a pair of plates 33 disposed perpendicular with respect to each other so as to present reinforcing radial webs preventing bending of the axle but at the same time admitting of torsional yielding of the axle incident to unequal rise or fall of the opposite ends thereof on the arms 29. The outer edges of the perpendicular plates 33 may be flanged, as at 34, for further reinforcing the plates against buckling action.

Figure 6:
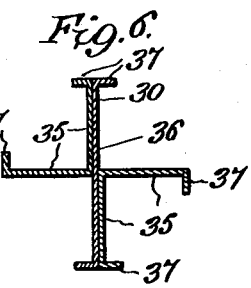
Figure 6 is a similar view taken through a modified form of the same.

In Figure 6 a modification of the axle is shown wherein it comprises a pair of right angle plates 35 arranged in diametrically opposed positions and connected together by a third rectangular plate 36 which is secured against one flange of each of the right angle plates 35. The outer edges of the plates 35 and 36 may be provided with reinforcing flanges 37 as shown.

Figure 7:
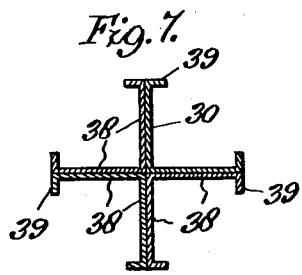
Figure 7 is a transverse section taken through the axle showing another modified cross-sectional view thereof.

Another form of the axle 30 is shown in Figure 7 wherein four right angle plates 38 are secured together in abutting relation to provide radial webs, and the webs have right angle flanges 39 at their outer edges for reinforcing the webs.

Figure 8:
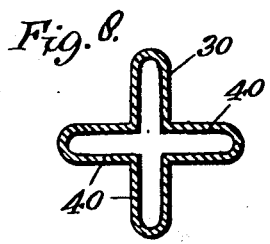
Figure 8 is a like view showing a further modified form of axle.

In Figure 8 a further modification is shown of the axle 30 which may comprise a tube suitably bent or fluted at its sides to provide radial webs 40 which may be relatively disposed to provide double thick radial webs to reinforce the axle against bending but which admit of the desired torsional displacement of the axle.

Figure 9:
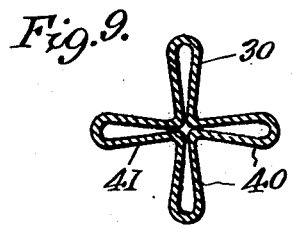
Figure 9 is a transverse section through the axle showing another modified form thereof.

A further modification of the axle 30 is shown in Figure 9 wherein the hollow tube is longitudinally fluted or corrugated and suitably pressed into shape to provide radial webs 41 of double thickness which may increase in cross sectional area toward the outer ends to provide substantially a star shaped axle having the same results of resisting bending of the axle and permitting torsional displacement thereof.

Figure 10:
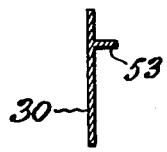
Figure 10 is a detail transverse section taken through another modified form of the axle.

The axle 30 may be of the cross-sectional construction shown in Figure 10 wherein the axle comprises a flat web or strip having a reinforcing rib 53 at one side which maintains the strip against bending but which admits of the torsional displacement of the strip.

Figure 11:
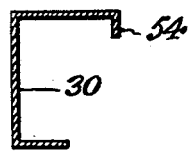
Figure 11 is a like view taken through another modified form of the same.

In Figure 11 another form of the axle 30 is shown wherein the same comprises a channel plate with one flange considerably longer than the other and provided with a short rib or flange 54 on the outer end of the long flange. This holds the axle 30 against bending but admits of torsional displacement.

Figure 12:
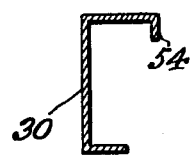
Figure 12 is a similar view showing a further modification.

The modification shown in Figure 12 shows the axle 30 of channel construction with one flange only slightly longer than the other and thus differs from the form shown in Figure 11 in occupying less space transversely of the axle.

Figure 13:
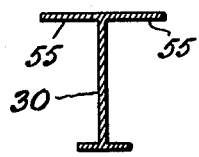
Figure 13 is a like view showing another modified form of the axle.

The form of axle 30 shown in Figure 13 comprises an I-beam, the upper flanges 55 of which are of greater depth than the lower flanges as shown in the figure so as to reinforce the arm against bending but admitting of torsional displacement.

Figure 14:
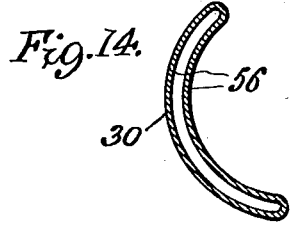
Figure 14 is a transverse section taken through the axle showing another modified form.

Another form of the axle is shown in Figure 14 wherein the axle 30 may comprise a tubular body which is flattened and transversely curved into substantially crescent shape with its opposite web portions 56 spaced slightly apart to reinforce the axle and admit of torsional displacement.

Figure 15:
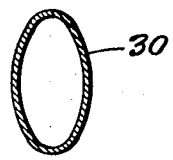
Figure 15 is a similar view showing another modification thereof.

In Figure 15 the axle 30 is shown relatively rigid against bending and as comprising a tubular body which may be flattened if desired into transverse oval or elliptical shape as shown. This admits a desired torsional displacement but maintains the axle against bending.

Figure 16:
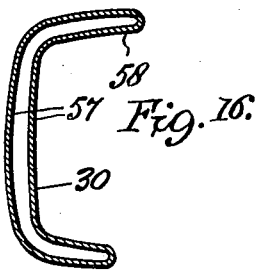
Figure 16 is a transverse section taken through the axle showing another modified form.

In Figure 16 the axle 30 is also formed of a tubular body but of larger diameter than that shown in Figures 14 and 15 and which is flattened and bent into substantially channel form to provide spaced webs 57. One of the channel flanges 58 may be longer than the other so as to give the desired stability to the axle 30 at either the upper or lower edge, according to the positioning of the axle in the structure.

In all forms the axle 30 resists bending in all planes and the wheels 32 always remain in parallel relation to each other.

With reference again to Figures 1 and 21 the axle 30 with its arms 29 are held against lateral displacement with regard to the body 25 of the vehicle by a transverse rod 42 which may be anchored at one end to one of the brackets 28 at one side of the body 25 and at its other end may be anchored to the axle 30 at the opposite side of the vehicle. This rod 42 may of course extend in a general lengthwise and inclined direction with respect to the body 25 and axle 30.

Figure 2:
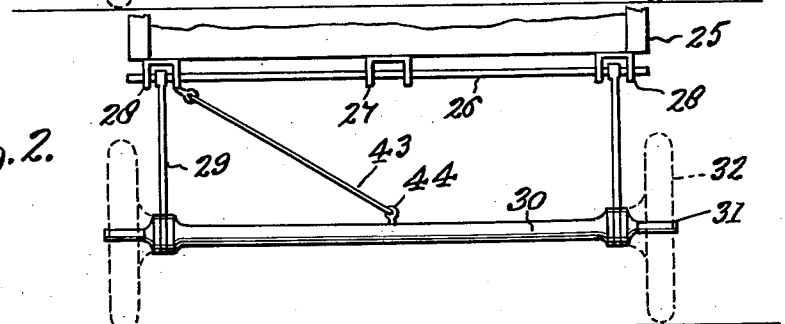
Figure 2 is a similar view showing a slight modification in the anchoring or stabilizing rod.

In Figure 2 a slight modification of the lateral stabilizing rod is shown wherein the rod 43 is connected to one of the brackets 28 at one side of the body 25 but at its other end is secured to an eye 44 which may be carried by the axle 30 intermediate its ends so that the stabilizing rod 43 is relatively short as compared with the rod 42.

Figure 3:
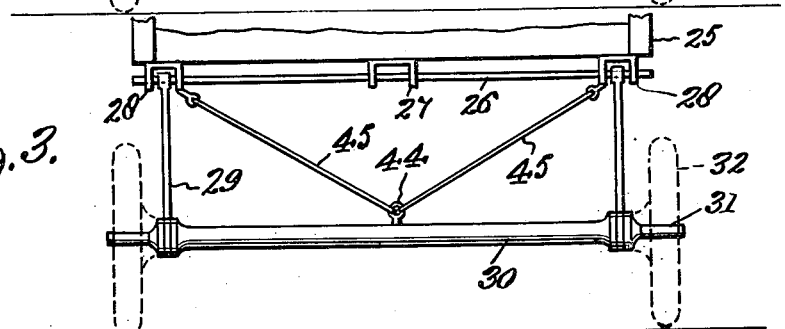
Figure 3 is a like view showing a further modification of the stabilizing or anchoring rod.

In the modification shown in Figure 3, a pair of stabilizing rods 45 is employed. The forward ends of the rods 45 are anchored to the opposite brackets 28 of the body 25 and the rods 45 converge horizontally rearward toward the axle 30 and are anchored at their rear ends to the eye 44 at the middle portion of the axle. This construction provides a more rigid assembly and holds the parts against relative lateral sway.

Figure 4:
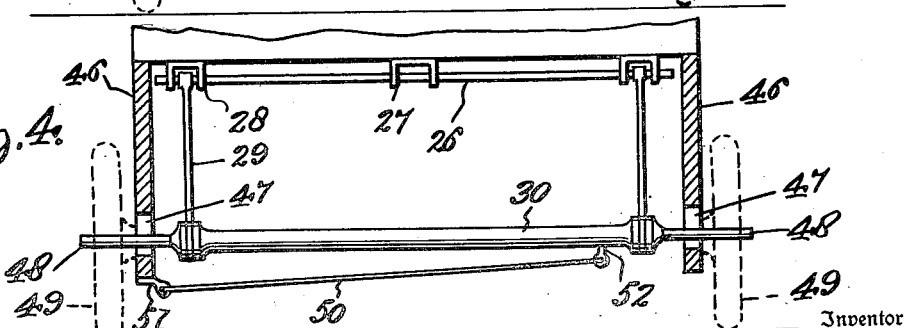
Figure 4 is another view of the same showing a still further modified form of stabilizing rod structure.

In the modification shown in Figure 4, the body 25 is provided with side aprons or shields 46 which extend rearwardly beyond the axle 30 and are provided with slots 47 or the like through which elongated spindles 48 of the axle may extend. Wheels 49 are mounted on the spindles 48 at the outer sides of the aprons or shields 46. With this construction the stabilizing rod 50 may be anchored at one end to an eye 51 carried on the outer end of the shield 46, and is anchored at its other end to an eye 52 carried by the axle 30 near the opposite side of the vehicle. Of course this rod arrangement may be duplicated and crossed if desired. It is also understood that various other arrangements of the stabilizing rods may be resorted to.

The connecting rods or arms 29 resist bending in the vertical plane to support the load but admit a certain flexure laterally and undergo torsional displacement in use.

Figure 17:
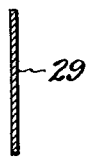
Figure 17 is a transverse section showing one form of the arm or tie rod.
Figure 18:
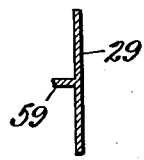
Figure 18 is a like view illustrating a modification thereof.

In Figure 17 the rod or arm 29 may comprise a flat strip of metal of sufficient thickness and inherent stability to hold the arm 29 against vertical or edgewise bending but admitting of the desired twisting or torsional displacement thereof. In Figure 18 the arm 29 is of the strip construction of Figure 17 but with a reinforcing web or rib 59 at one side thereof and intermediate its longitudinal edges.

Figure 19:
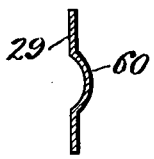
Figure 19 is a like view showing a further modified form.
Figure 20:
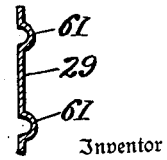
Figure 20 is another transverse section taken through the tie rod or arm showing a further modified form thereof.

In Figure 19 the rod or arm 29 is of the strip form but with a longitudinal central bead 60 which is pressed to one side of the strip so as to offer the desired resistance to bending of the strip but admitting of the twisting thereof. The form of the arm 29 shown in Figure 20 is also of the strip construction but with a pair of spaced apart beads 61 pressed to one side of the arm and located preferably near the opposite longitudinal edges thereof to reinforce the arm against bending but to admit of the desired twisting thereof.

It will thus be observed from the above description that in the invention there exists between the axle 30 and the body 25 of the vehicle no member or members which require machining or precise construction in their making and in their mounting, and also there are no parts which require grease or other types of bearings. There are no members in the construction which are subject to wear and the action between the parts is by torsion of the axle 30, the rod 26 and the arms 29.

By the constructions above described the rigidity of the axle 30 in a transverse direction is thus assured and it thus holds the wheels in true parallel relation but the axle may readily twist about its axis without exceeding its elastic limit or the limit of its endurance to strain. The torsion between the two extremities of the axle 30 may, in the examples herein shown, attain a magnitude of approximately 30° by the action of the torsion torques having a value of 5 to 20 meter-kilograms.

For instance Fig. 22 the arms 29 may be connected to the chassis by a stud 64, the torsion rod 26 being suppressed so that the arms 29 are able to pivot freely relatively to the frame. In the same time any kind of elastic connection will be provided between the arms and the chassis for instance by means of leaf springs (63) or coiled springs, rubber blocks etc., to return said arms 29 to their initial position of rest.

It is apparent that when one wheel 32 is raised by an undulation or obstruction in the roadway the adjacent end of the axle 30 is raised, as is the adjacent end of the arm 29. As the arms 29 are fixed to the opposite ends of the axle 30 a torsional resistance is immediately set up. This torsional resistance is also transmitted to the arms 29 which are displaced proportionately and further to the torsion rod 26 which is also correspondingly displaced. By this wide distribution of the torsion forces, the desired amplitude of movement of the end of the axle is obtained with the result that the shock incident to the sudden rise of the axle is gradually absorbed and the counteraction of the parts under torsional strain serves to gradually return the parts to their normal or static positions.

In like manner where the axle 30 is bodily lifted by equal vertical displacements at opposite ends, the arms 29 at their outer ends swing upwardly and uniformly and the opposite ends of the torsion rod 26 are twisted so as to absorb the shock imposed on the axle and to gradually raise the vehicle body 25 incident to the rebound torsional strain set up in the rod 26.

It will be obvious that various changes may be made in the construction, combination and arrangement of parts which could be used without departing from the spirit of my invention and I do not mean to limit the invention to such details except as particularly pointed out in the claims.

Having thus described my invention what I claim and desire to secure by Letters Patent of the United States is:—

1. In combination with a vehicle body, an axle, a pair of spaced apart substantially horizontal arms secured at one end to said axle, a torsional rod connecting the opposite ends of said arms together, means engaging the body and the rod in substantially the center thereof to hold the longitudinal center of said rod against rotation, and bearings for the ends of the rod fixed to the body and engaging on opposite sides of said opposite ends of the arms to rotatably support the ends of the rod from the body.

2. In combination with a vehicle body, an axle, a pair of spaced apart substantially horizontal arms secured at one end to said axle, a torsional rod connecting the opposite ends of said arms together, spaced apart securing means fixed to the body and to the arms on opposite sides of the longitudinal center thereof to hold the central portion of the rod against rotation relative to the body, and bearings for the ends of the rod fixed to the body and engaging on opposite sides of said opposite ends of the arms to rotatably support the ends of the rod from the body.

3. In combination with a vehicle body, an axle, a pair of spaced apart substantially horizontal arms secured at one end to said axle, a torsional rod connecting the opposite ends of said arms together, spaced apart securing means fixed to the body and to the rod on opposite sides of the longitudinal center thereof to hold the central portion of the rod against rotation relative to the body, bearings for the ends of the rod fixed to the body and engaging on opposite sides of said opposite ends of the arms to rotatably support the ends of the rod from the body, and bracing means engaging the body and the axle to hold said arms against lateral movement.

PIERRE MARCEL BOURDON.